US012644061B1

(12) United States Patent
Rehmat et al.

(10) Patent No.: US 12,644,061 B1
(45) Date of Patent: Jun. 2, 2026

(54) THERMO-CHEMICAL TRANSFORMATION OF WET FOOD WASTE WITH PLASTICS, BIODEGRADABLE PACKAGING, AND FLUORINATED COMPOUNDS IN A MULTI-ANNULAR CONCENTRIC FEED ROTARY KILN SYSTEM

(71) Applicant: Simple Approach Systems, Inc., Schaumburg, IL (US)

(72) Inventors: Amirali G. Rehmat, Hanover Park, IL (US); Renee L. Comly, Marshall, VA (US); Alex Mathew, Palatine, IL (US); Manpreet Kaur, Roselle, IL (US); Abdul Khader Muhammed Isahil, Kerala (IN); Gireeshkumar Padmanabhan Nair, Kerala (IN)

(73) Assignee: Simple Approach Systems, Inc., Schaumburg, IL (US)

( * ) Notice: Subject to any disclaimer, the term of this patent is extended or adjusted under 35 U.S.C. 154(b) by 0 days.

(21) Appl. No.: 19/396,933

(22) Filed: Nov. 21, 2025

(51) Int. Cl.
*C10J 3/00* (2006.01)
*B01D 53/50* (2006.01)
(Continued)

(52) U.S. Cl.
CPC ............ *C10J 3/005* (2013.01); *B01D 53/508* (2013.01); *B01D 53/523* (2013.01);
(Continued)

(58) Field of Classification Search
CPC .... C10J 3/005; C10J 3/723; C10J 3/86; C10B 49/04–06; C10B 53/07; F27B 2007/005;
(Continued)

(56) References Cited

U.S. PATENT DOCUMENTS 6,698,365 B2    3/2004  Shibata
9,862,899 B2 *  1/2018  Rehmat .................... F27B 7/30
(Continued)

FOREIGN PATENT DOCUMENTS

CN      106369610 A      2/2017
ES       2599984 T3      2/2017
(Continued)

OTHER PUBLICATIONS

Alburquerque, J.A., de la Fuente, C., Ferrer-Costa, A., Carrasco, L., Cegarra, J., Abad, M., and Bernal, M.P. (2012). Assessment of the fertiliser potential of digestates from farm and agroindustrial residues. Biomass and Bioenergy, 40, 181-189.
(Continued)

*Primary Examiner* — Renee Robinson
(74) *Attorney, Agent, or Firm* — FisherBroyles, LLP; Joseph Hyosuk Kim

(57) ABSTRACT

The invention relates to a system and process for thermo-chemical transformation of mixed wet waste streams using a rotary kiln reactor equipped with a multi-annular concentric feed assembly. A central conduit introduces wet food waste mixed with plastics, biodegradable packaging, and fluorinated materials, while an intermediate annulus supplies auxiliary fuel and an outer annulus delivers oxidant gas under controlled sub-stoichiometric conditions. The kiln operates through sequential zones of reduction, partial oxidation, and complete oxidation to convert organics into hydrogen, carbon monoxide, methane, and finally carbon dioxide and water. Halogens and sulfur compounds are converted to hydrogen halides and hydrogen sulfide, which are neutralized downstream with calcium oxide to form stable salts. Heat recovery from the flue gas produces steam or hot water. The process eliminates pre-drying, allows co-processing of wet and dry wastes, and provides efficient
(Continued)

Feed Annulus (22) — Inlet Hood (36)
Fuel →
Waste →
Oxidant →
(10)
b
a
(30)
(32)
(34)
c energy recovery in a compact, scalable configuration. The invention eliminates the need for pre-drying or segregation, enabling simultaneous treatment of heterogeneous feedstocks.

11 Claims, 5 Drawing Sheets

(51) Int. Cl.

| | |
|---|---|
| *B01D 53/52* | (2006.01) |
| *B01D 53/68* | (2006.01) |
| *B01D 53/83* | (2006.01) |
| *C10B 49/06* | (2006.01) |
| *C10B 53/07* | (2006.01) |
| *C10J 3/72* | (2006.01) |
| *C10J 3/82* | (2006.01) |
| *C10J 3/86* | (2006.01) |
| *C10K 1/00* | (2006.01) |
| *C10K 1/02* | (2006.01) |
| *C10K 1/22* | (2006.01) |
| *C10K 1/30* | (2006.01) |
| *C10K 1/32* | (2006.01) |

(52) U.S. Cl.
CPC ........... *B01D 53/685* (2013.01); *B01D 53/83* (2013.01); *C10B 49/06* (2013.01); *C10B 53/07* (2013.01); *C10J 3/723* (2013.01); *C10J 3/82* (2013.01); *C10J 3/86* (2013.01); *C10K 1/004* (2013.01); *C10K 1/024* (2013.01); *C10K 1/22* (2013.01); *C10K 1/30* (2013.01); *C10K 1/32* (2013.01); *B01D 2251/304* (2013.01); *B01D 2251/402* (2013.01); *B01D 2251/404* (2013.01); *B01D 2251/602* (2013.01); *B01D 2251/606* (2013.01); *B01D 2253/1124* (2013.01); *B01D 2257/2045* (2013.01); *B01D 2257/2047* (2013.01); *B01D 2257/302* (2013.01); *B01D 2257/304* (2013.01); *B01D 2258/0283* (2013.01); *C10J 2300/0946* (2013.01); *C10J 2300/0956* (2013.01); *C10J 2300/0959* (2013.01); *C10J 2300/0976* (2013.01); *C10J 2300/1223* (2013.01); *C10J 2300/1606* (2013.01); *C10J 2300/1643* (2013.01); *C10J 2300/1656* (2013.01); *C10J 2300/1687* (2013.01); *C10J 2300/1846* (2013.01)

(58) Field of Classification Search
CPC .. F27B 2007/025; F27B 7/02; F27B 7/08–12; F23G 5/20; F23G 5/027; F23G 5/0276; F23G 7/12; F23G 2203/206; F23G 2203/207

See application file for complete search history.

(56) References Cited

U.S. PATENT DOCUMENTS

| | | | |
|---|---|---|---|
| 9,885,478 B1 | 2/2018 | May | |
| 2012/0217442 A1* | 8/2012 | Jeney ........................ | F27B 7/34 |
| | | | 422/198 |
| 2013/0119315 A1 | 5/2013 | Rehmat | |
| 2017/0275542 A1* | 9/2017 | Rehmat .................... | C10J 3/005 |
| 2022/0228070 A1 | 7/2022 | Chakraborty | |
| 2022/0389327 A1 | 12/2022 | Reimers | |
| 2023/0125763 A1* | 4/2023 | Lehmann ................ | C01B 3/363 |
| | | | 431/8 |

FOREIGN PATENT DOCUMENTS

| | | | |
|---|---|---|---|
| WO | 1998054273 A1 | 12/1998 | |
| WO | 2010069068 A1 | 6/2010 | |

OTHER PUBLICATIONS

Bi, W., Tang, Y., Li, X., Dai, C., Song, C., Guo, X., and Ma, X. (2022). One-step direct conversion of methane to methanol with water in non-thermal plasma. Communications Chemistry, 5, 91.

Bobrova, L., Vernikovskaya, N., and Sadykov, V. (2009). Conversion of hydrocarbon fuels to syngas in a short contact time catalytic reactor. Catalysis Today, 144, 185-200.

Møller, H.B., Sommer, S.G., and Ahring, B.K. (2004). Methane productivity of manure, straw and solid fractions of manure. Biomass and Bioenergy, 26, 485-495.

Periana, R.A., Taube, D.J., Gamble, S., Taube, H., Satoh, T., and Fujii, H. (1998). Platinum catalysts for the high-yield oxidation of methane to a methanol derivative. Science, 280, 560-564.

Ryckebosch, E., Drouillon, M., and Vervaeren, H. (2011). Techniques for transformation of biogas to biomethane. Biomass and Bioenergy, 35, 1633-1645.

Xie, J., Jin, R., Li, A., Bi, Y., Ruan, Q., Deng, Y., Zhang, Y., Yao, S., Sankar, G., Ma, D., and Tang, J. (2018). Highly selective oxidation of methane to methanol at ambient conditions by titanium dioxide-supported iron species. Nature Catalysis, 1, 889-896.

Yadvika, Santosh, Sreekrishnan, T.R., Kohli, S., and Rana, V. (2004). Enhancement of biogas production from solid substrates using different techniques—a review. Bioresource Technology, 95, 1-10.

* cited by examiner

FEED ANNULI

SHREDDER

WASTE
IN

CONTROL PANEL

KILN REACTOR

OXIDANT SUPPLY

SECONDARY REACTOR

OXIDANT SUPPLY

GAS MOVING DEVICE

HEAT RECOVERY DEVICE

FLUE GAS
EXIT

SORBENT INJECTOR

GAS SCRUBBING
DEVICE

STEAM
OUT

SOLID
RESIDUE OUT

THERMO-CHEMICAL TRANSFORMATION OF WET FOOD WASTE WITH PLASTICS, BIODEGRADABLE PACKAGING, AND FLUORINATED COMPOUNDS IN A MULTI-ANNULAR CONCENTRIC FEED ROTARY KILN SYSTEM

BACKGROUND OF INVENTION

Field of the Invention

The present invention relates to the field of integrated waste management, renewable energy production, and thermo-chemical conversion of heterogeneous waste streams. More particularly, it relates to a rotary kiln reactor system with multi-annular concentric feed architecture capable of converting wet food waste, plastics, biodegradable packaging, and fluorinated compounds into combustible gas and neutralized solid residues, while capturing acid gases and recovering heat energy.

General Background and the State of the Art

The rapid pace of global urbanization, industrial food processing, and the proliferation of modern consumer packaging have together generated an unprecedented volume of mixed municipal and industrial waste. A substantial fraction of this material consists of high-moisture organic residues such as food waste, combined with synthetic components including plastics, biodegradable packaging, and an increasing proportion of fluorinated and chlorinated polymer films used for chemical resistance and extended product shelf life. The presence of these diverse constituents in a single waste stream poses major challenges for existing waste-management technologies, particularly when high moisture and halogen content are involved.

Traditional incineration systems are generally designed for homogeneous, low-moisture wastes. When applied to wet or variable feedstocks, the latent heat of water evaporation significantly lowers combustion efficiency and raises auxiliary fuel requirements. Furthermore, plastics and fluorinated compounds thermally decompose to form highly corrosive acid gases such as hydrogen chloride (HCl) and hydrogen fluoride (HF), which damage boiler tubes, refractory linings, and emission-control equipment, leading to high maintenance costs and operational hazards.

Biological approaches such as anaerobic digestion offer little relief. While suitable for purely organic material, these systems are unable to process plastics, biodegradable packaging, or halogenated compounds and rapidly lose effectiveness when exposed to non-biodegradable solids or chemical contaminants. Similarly, thermo-chemical processes such as pyrolysis and gasification have found limited success with heterogeneous, high-moisture feedstocks. These methods are highly sensitive to feed size, composition, and water content and typically require extensive pretreatment, including shredding, drying, and segregation of plastics from organic matter-steps that add cost and complexity.

Among thermo-chemical systems, rotary kilns have been used extensively for cement manufacturing, hazardous-waste treatment, and sludge incineration because of their mechanical robustness and tolerance for mixed solid feeds. Prior designs, including those disclosed in U.S. Pat. No. 6,698,365 B1 (dual rotary kiln for staged heating) and WO 1998/054273 A1 (method for heating a rotary kiln), improved temperature control and residence-time management but continued to rely on external systems for acid-gas scrubbing. Consequently, these designs could not fully neutralize halogen or sulfur compounds within the primary reaction sequence. Moreover, conventional kilns introduce fuel and oxidant through side ports or end burners without careful optimization of their spatial distribution. This often results in uneven temperature profiles, incomplete reactions, and inefficient energy recovery.

The growing use of fluorinated and chlorinated polymers in modern packaging has further complicated the problem. When these materials are subjected to heat, they produce not only HCl and HF but also persistent per- and poly-fluoroalkyl substances (PFAS and PFOS) that remain in the gas or solid phase even after conventional combustion. Controlling such emissions typically requires downstream wet scrubbers or activated-carbon filters, which add significant capital cost and generate secondary liquid waste streams that themselves require treatment.

To date, no single technology has successfully integrated the destruction of fluorinated waste, the conversion of organic matter, and the neutralization of acid gases within a single, continuous reactor system. The ability to treat such chemically diverse feedstocks without extensive preprocessing represents a critical technical and environmental objective. There is therefore a pressing need for an energy-efficient, environmentally compliant process capable of handling high-moisture, heterogeneous waste streams, co-processing plastics and biodegradable packaging with food waste, and achieving complete neutralization of halogen and sulfur species while simultaneously recovering heat energy and maintaining low emissions under controlled sub-stoichiometric conditions.

Recent research and commercial developments have addressed portions of this problem but not the complete solution. Gasification of biomass and plastics has been explored in US 2022/0389327 A1 (plastic feeding to pyrolysis reactors) and US 2022/0228070 A1 (conversion of plastics to petrochemicals). Rotary-kiln gasification for waste-to-energy applications has been advanced in US 2013/0119315 A1 and the European DIRK Differentiated Injection Rotary Kiln project (2010). Waste-to-syngas systems such as U.S. Pat. No. 9,885,478 B2 (Recycling Solutions Technology LLC) have optimized multi-zone temperature profiles for cleaner gas production. Yet none of these designs describe or anticipate a multi-annular concentric feed system in which wet waste, fuel, and oxidant are introduced through separate, coaxial conduits arranged to maintain sub-stoichiometric conditions, achieve self-sustaining thermo-chemical conversion, and permit in-line acid-gas neutralization using calcium oxide or equivalent sorbents.

The present invention addresses these deficiencies by combining the inherent mechanical flexibility of the rotary kiln with a multi-annular feed mechanism and integrated reaction-zone control. Through this configuration, uniform heat distribution is maintained despite wide fluctuations in feed moisture and composition, while halogen and sulfur compounds are captured efficiently without external scrubbers. The system enables direct recovery of thermal energy through high-efficiency heat exchange, minimizes secondary waste generation by performing neutralization in situ, and provides a compact, scalable pathway for transforming problematic mixed waste streams into usable synthesis gas and chemically inert solids. This integrated approach represents a significant advancement in the field of thermo-chemical waste conversion and offers a practical route toward environmentally sustainable resource recovery.

The invention is applicable to municipal waste treatment plants, food processing facilities, distilleries, and remote installations requiring conversion of heterogeneous waste streams into energy. It is particularly suited for island communities, military bases, and agricultural sites where wet waste, plastics, and packaging residues coexist. The system's tolerance for moisture and halogen content, coupled with in-line acid gas neutralization, provides a sustainable and low-emission waste-to-energy solution.

SUMMARY OF THE INVENTION

The present invention provides an integrated system and process for the thermo-chemical conversion of wet and mixed waste streams within a rotary kiln reactor employing a unique multi-annular concentric feed architecture. In its preferred embodiment, the reactor is configured with three distinct, coaxially arranged conduits that enable precise delivery and staging of materials required for controlled thermo-chemical transformation.

A central feed conduit introduces a heterogeneous mixture of wet food waste, post-consumer plastics, biodegradable packaging, and fluorinated materials into the rotary kiln. Surrounding this is a first annular conduit that delivers auxiliary fuel such as diesel, propane, or natural gas used to supplement the heat required for initiating or sustaining the reaction when the inherent calorific value of the waste feed is insufficient. Encasing both of these is a second annular conduit that supplies the oxidant gas, which may be air, oxygen-enriched air, or a mixture of oxygen and steam. The oxidant flow is regulated to maintain sub-stoichiometric conditions that promote reduction and partial oxidation reactions rather than full combustion in the initial zones of the kiln.

The rotary kiln reactor operates sequentially through three reaction zones, each performing a distinct chemical function. In the first zone, sub-stoichiometric reduction and pyrolysis occur, converting organic materials into carbon monoxide, hydrogen, methane, and volatile intermediates while simultaneously transforming halogens into hydrogen chloride and hydrogen fluoride, and sulfur compounds into hydrogen sulfide. The second zone provides partial oxidation and gasification, stabilizing the gas composition and maintaining a controlled temperature range of approximately 1,400° F. to 2,200° F. through the interaction of auxiliary fuel and oxidant. The third and final zone functions as a complete oxidation zone, where the temperature is elevated to between 2,100° F. and 2,400° F. and sufficient oxidant is introduced to convert remaining combustible gases-including carbon monoxide, hydrogen, and methane-into carbon dioxide and water vapor.

The hot gases exiting the kiln are directed through a heat-recovery unit, where thermal energy is extracted to produce high-pressure or low-pressure steam that can be utilized for power generation, heating, or other industrial processes. The cooled gas stream then passes through a particulate filtration and acid-gas neutralization system, where calcium oxide (CaO) is injected to react with acid gases such as hydrogen chloride, hydrogen fluoride, and sulfur dioxide. These reactions yield stable compounds— calcium chloride ($CaCl_2$), calcium fluoride ($CaF_2$), and calcium sulfate ($CaSO_4$)—which are easily captured and removed as benign solid residues.

Through this integrated configuration, the invention eliminates the need for separate pre-drying or feed segregation stages, allowing simultaneous processing of wet, dry, and chemically diverse waste materials in a single apparatus.

The process achieves in-line halogen and sulfur neutralization, maintains a compact and scalable system design, and ensures efficient recovery of thermal energy. Together, these attributes provide a robust, adaptable, and environmentally responsible solution suitable for both stationary and modular installations.

All figures are provided for illustrative purposes only and are not drawn to scale.

DETAILED DESCRIPTION OF THE PREFERRED EMBODIMENTS

Through its multi-annular feed design, internal zonal control, and integrated sorbent injection, the system offers a comprehensive and self-contained method for mixed-waste thermo-chemical conversion. It can transform a wide variety of feedstocks, from high-moisture food residues to polymeric and halogenated materials, into useful energy and chemically stable by-products, all within a single integrated process that reduces environmental impact and simplifies operation.

Figure 1:
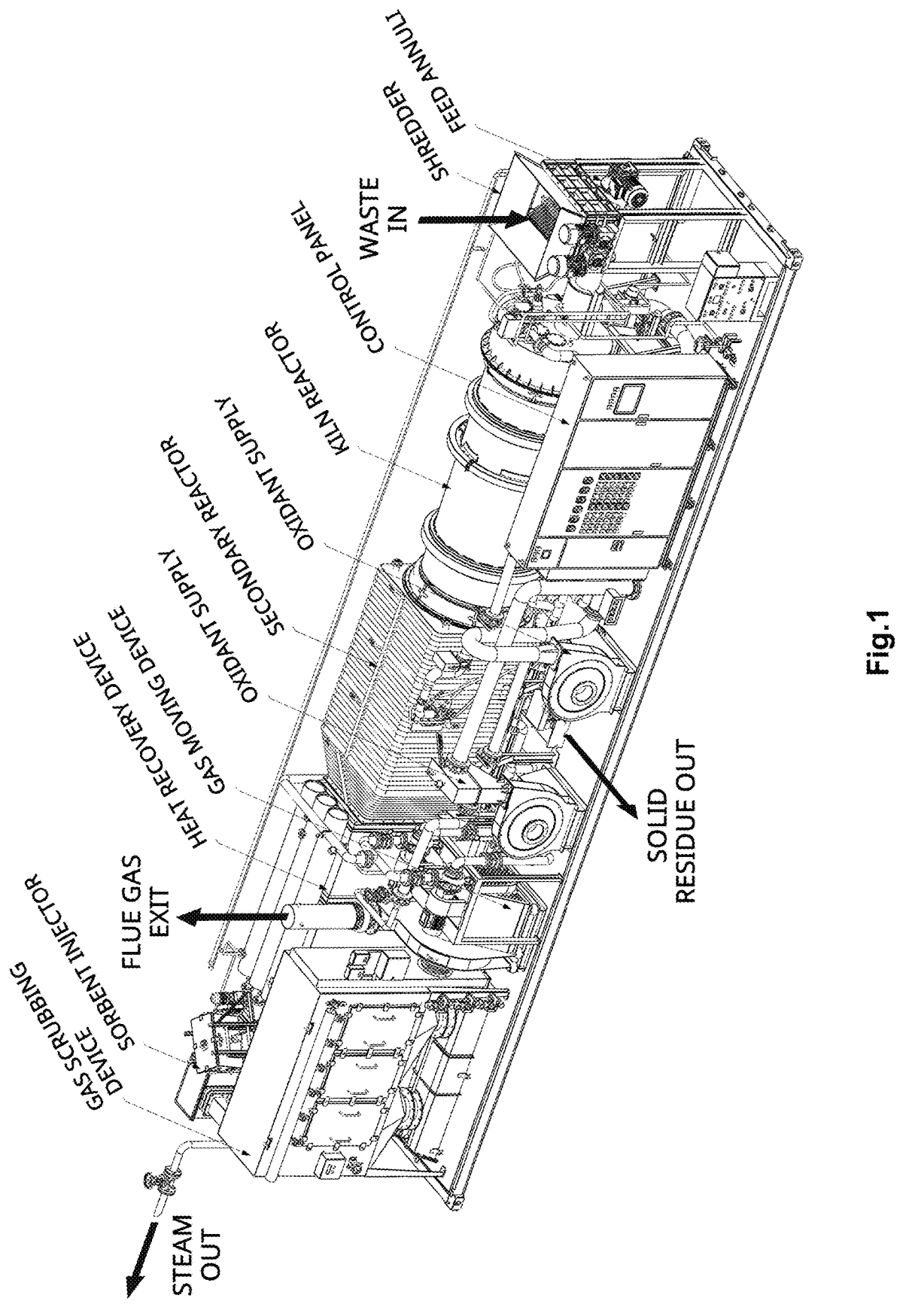
FIG. 1 shows a typical complete assembly of expeditionary and portable thermochemical conversion apparatus described by this invention.

As shown schematically in FIG. 1, the invention includes a complete assembly for an expeditionary thermo-chemical conversion system designed to receive, process, and recover energy from various waste streams. The system accepts feedstocks including wet food waste, post-consumer plastics, biodegradable packaging materials, and fluorinated or halogenated compounds. All essential stages—feed preparation, rotary kiln thermo-chemical conversion, acid-gas neutralization, and heat recovery—are integrated within the same modular structure.

Figure 2:
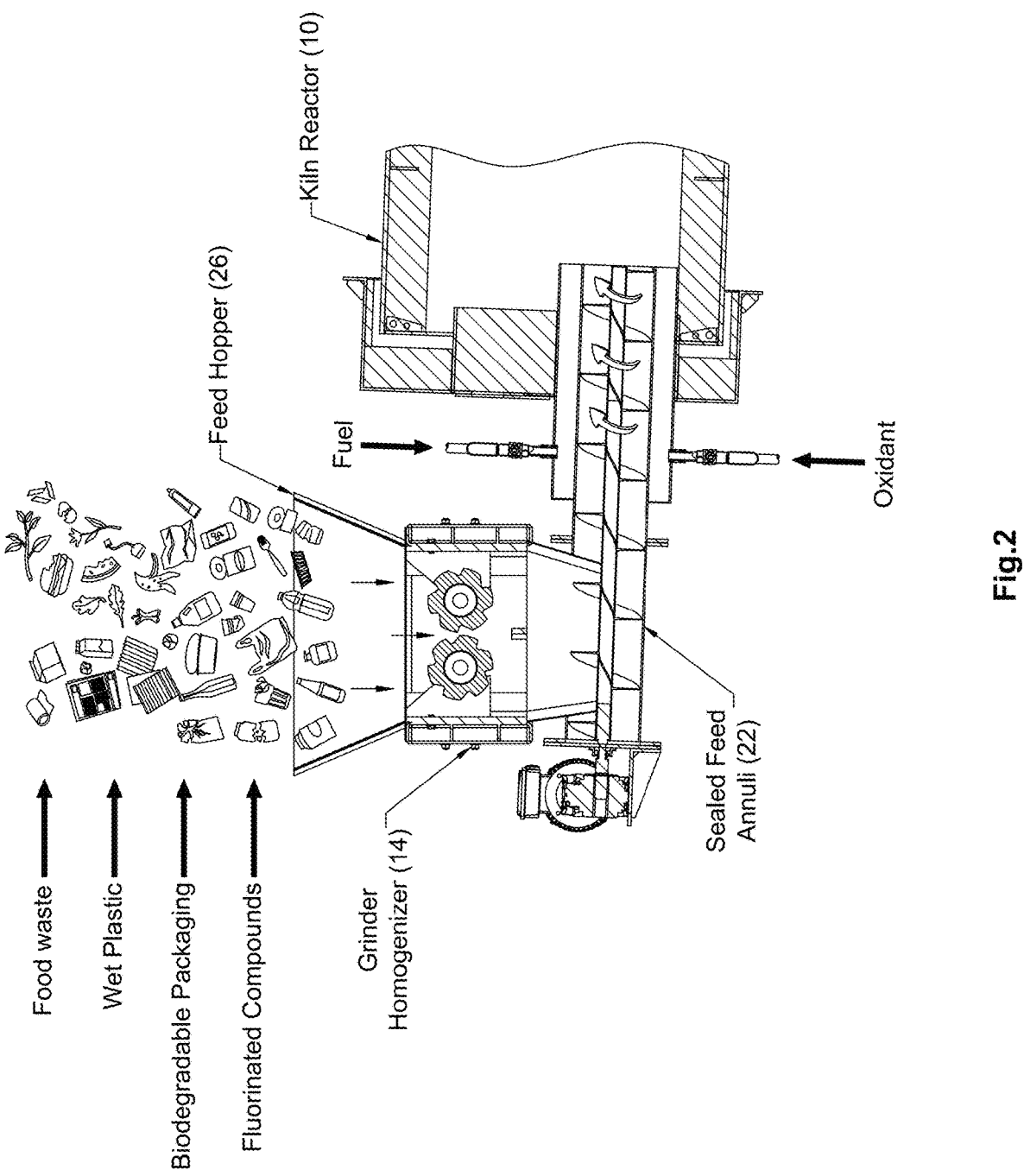
FIG. 2 illustrates typical preprocessing of waste materials, including food waste, plastics, biodegradable packaging, and fluorinated compounds, followed by delivery of the preprocessed waste mixture to the kiln reactor.

Referring to FIG. 2, the main part of the system is a rotary kiln reactor (10) with a sealed multi-annular concentric feed assembly (12). This feed system provides three or more separate flow paths for introducing feed material, auxiliary fuel, and oxidant gases. The design ensures each stream enters the kiln at a specific rate and position, allowing precise control of local stoichiometry, temperature balance, and the order of reactions along the reactor's length.

The system can handle a wide variety of waste types with little or no preprocessing. Typical feed materials include wet food waste, plastics such as PE, PP, and PET, biodegradable packaging like PLA, cellulose, and paper, fluorinated polymers such as PTFE and PVDF, and small amounts of inert solids like metal, glass, or ash. Feedstocks are usually shredded to under one inch for consistency. Water may be added to create a pumpable or uniform mixture, but pre-drying is not necessary. A feed preparation module, including a grinder or homogenizer (24) and a feed hopper (26), delivers material continuously to the central feed conduit via a screw conveyor or pump.

Figure 3:
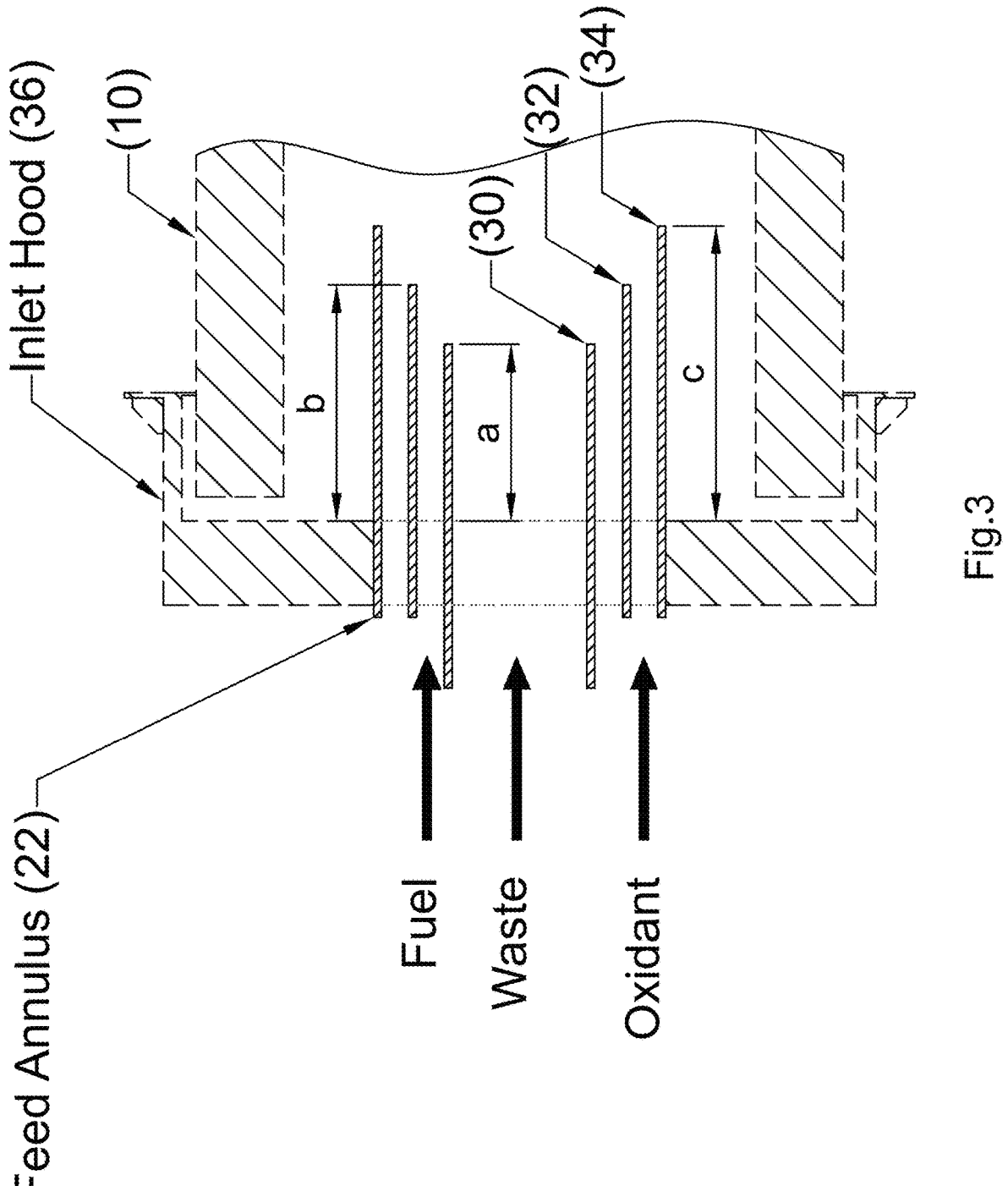
FIG. 3 is a cross-sectional schematic of a rotary kiln reactor showing concentric feed annuli (Central-Waste, Mid-Fuel, Outer-Oxidant).

As shown in FIG. 3, the rotary kiln (10) is an elongated cylindrical reactor lined with refractory brick or castable ceramic resistant to halogen corrosion. The kiln is installed at a slight tilt, usually between 1° and 5°, to facilitate the axial movement of the feed by gravity. At its inlet (22), it provides concentric channels for controlled sequential introduction of feed, fuel, and oxidant streams. The central conduit (30) carries the main waste feed, which may be slurries or coarse solids. Surrounding this is the intermediate annulus (32), which supplies auxiliary fuel-either gaseous, liquid, or atomized-such as propane, diesel, or syngas. The outermost annulus (34) delivers the oxidant gas, which may include air, oxygen-enriched air, or a steam-oxygen mixture introduced at adjustable flow rates. Each conduit is independently valved and flow-controlled to maintain zone-specific stoichiometric ratios and temperature profiles. This coaxial jet structure promotes intense mixing at the kiln entrance while preventing localized overheating or premature ignition.

Alternative embodiments may include a fourth annulus for steam or inert gas injection to regulate composition and temperature. As shown in FIG. 3, the central conduit of feed annulus (22) penetrates the kiln from the inlet hood (36) by a distance "a" ranging from 3 inches to 12 inches into the kiln (10). The intermediate annulus (32) extends from the inlet hood by a distance "b" between 18 inches and 24 inches, and the outer annulus (34) extends by a distance "c" between 30 inches and 36 inches into the kiln. These staggered penetration lengths create distinct mixing zones, ensuring controlled interaction of feed, fuel, and oxidant streams.

Inside the kiln, rotation at about 0.5 to 3 rpm combined with gravity creates continuous mixing and close gas-solid contact. The internal refractory lining may include helical flights or lifting vanes that help lift and cascade the waste bed, improving heat transfer even when processing wet feed and preventing cold zones. Computational fluid dynamics (CFD) modeling shows that this annular feed shape forms three main flow regimes: an inner reduction core rich in CO, $H_2$, and hydrocarbon radicals; an intermediate oxidation sheath where fuel and oxygen partially react; and an outer temperature-control zone that balances the overall thermal gradient. This self-buffering setup prevents thermal runaway and sustains high conversion efficiency.

Figure 4:
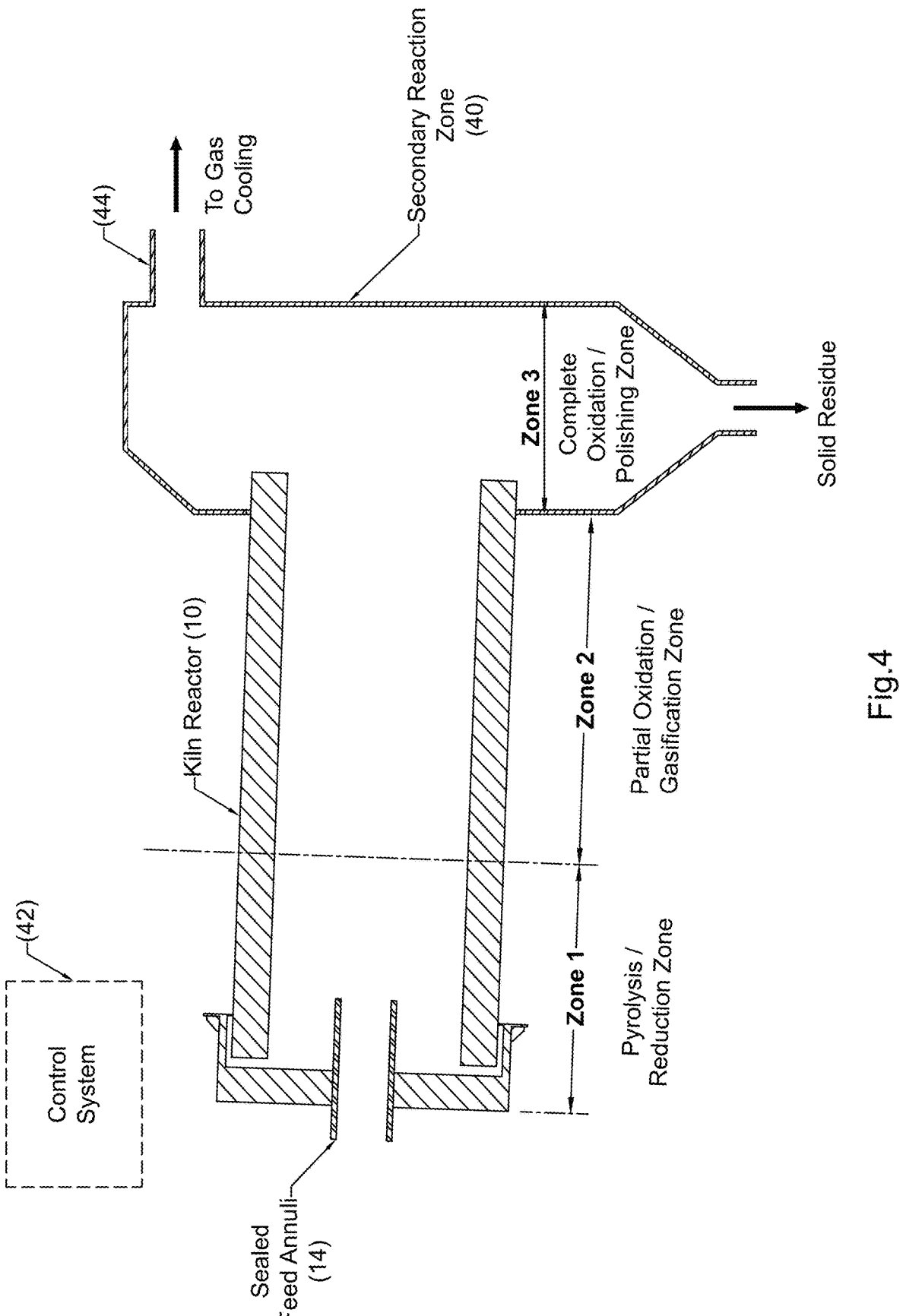
FIG. 4 shows the thermo-chemical reaction zones of the rotary kiln reactor conversion system.

The rotary kiln reactor is divided into three functional zones along its length, as shown in FIG. 4.

Zone I—Pyrolysis/Reduction Zone:

In this initial zone, the feed undergoes drying, devolatilization, and partial reduction under sub-stoichiometric conditions. Operating temperatures range from 700° C. to 1,000° C. (1,400° F. to 1,800° F.), with an oxygen ratio between 0.2 and 0.5. Main reactions include dehydration of food waste, thermal cracking of plastics, and volatilization of halogen and sulfur compounds. Typical reactions are represented by:

$$C_xH_yO_z \rightarrow CO, CO_2, CH_4, H_2, tars$$

$$(CH_2)_n \rightarrow CH_4 + C_2H_4 + C_nH_m$$

$$Metal\ oxides \rightarrow Reduced\ metals + HCl/HF$$

Within this zone, moisture is removed, organic compounds decompose, and reducing gases are formed. Hydrogen produced from steam and hydrocarbons reacts with halogenated organics to create stable gaseous species like HCl and HF.

Zone II—Partial Oxidation/Gasification Zone:

This intermediate region operates at 900° C. to 1,200° C. (1,650° F. to 2,200° F.) with an oxygen ratio of 0.6 to 0.9. Major reactions include the Boudouard and water-gas reactions.

$$C + H_2O \rightarrow CO + H_2$$

$$C + CO_2 \rightarrow 2CO$$

along with the partial oxidation of hydrocarbons:

$$CH_4 + \tfrac{1}{2}O_2 \rightarrow CO + 2H_2$$

These endothermic gasification reactions are driven by the heat generated through controlled oxidation of the auxiliary fuel. Temperature sensors and control algorithms adjust the flow of fuel and oxidant to keep the desired temperature profile in the zone.

Zone III—Complete Oxidation/Polishing Zone:

In the terminal section, complete oxidation occurs at temperatures between 1,150° C. and 1,300° C. (2,100° F.-2,400° F.) with oxygen ratios of 1.0 or higher. Residual CO, $CH_4$, and $H_2$ are converted into $CO_2$ and $H_2O$, while hydrogen sulfide is oxidized to $SO_2$. The effluent gas from this zone mainly contains $CO_2$, $H_2O$, $N_2$, and $O_2$, along with trace amounts of HCl, HF, and $SO_2$, as well as entrained particulates.

Figure 5:
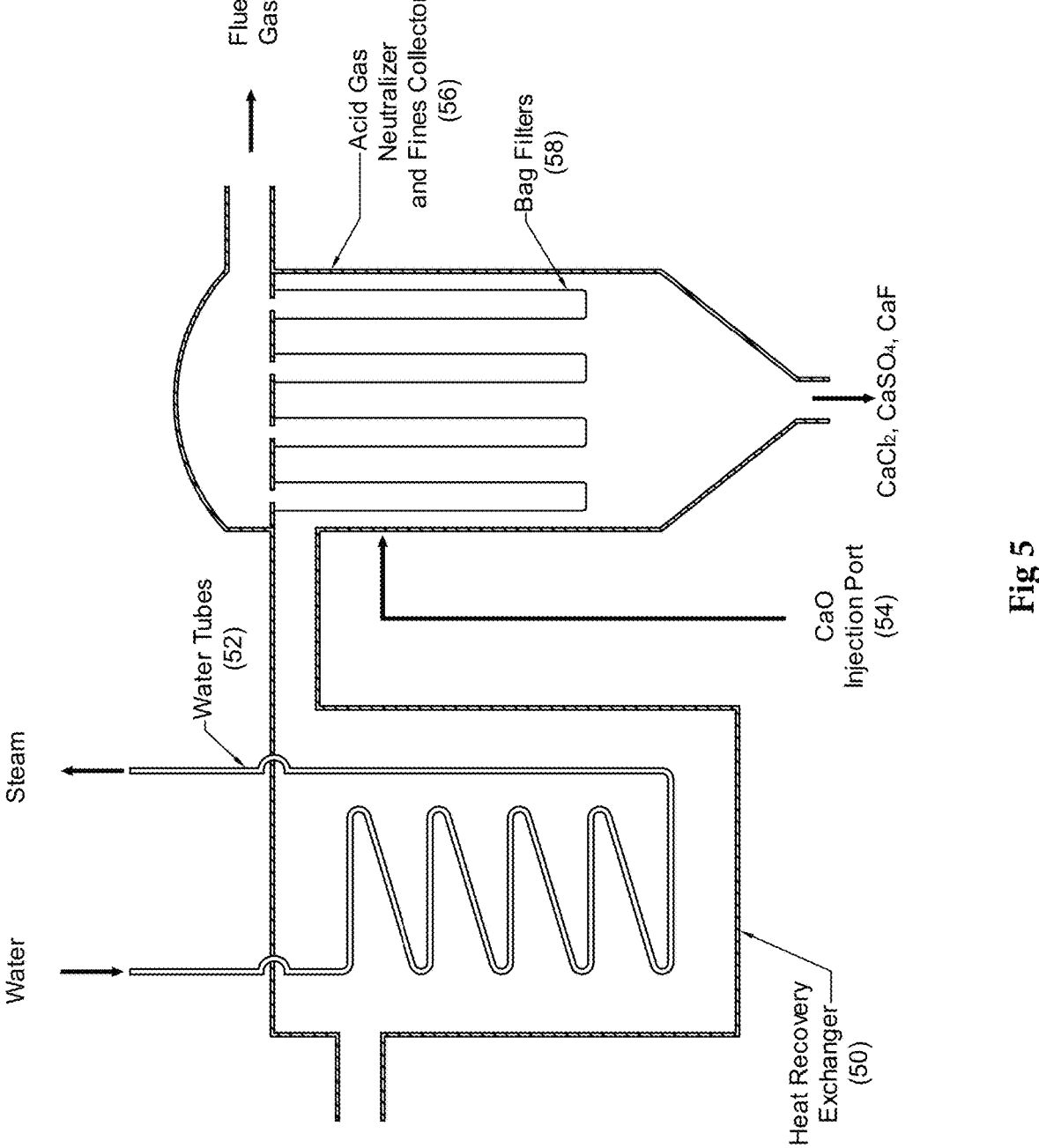
FIG. 5 depicts in-line gas cooling, acid gas neutralization, and gas cleanup processes related to the thermo-chemical conversion apparatus.

Downstream of the kiln, the effluent gases exit through a conduit (44) into a heat-recovery exchanger (50), as shown in FIG. 5. This exchanger contains water tubes (52) that absorb heat from the flue gas to generate high- or low-pressure steam. The cooled gases then pass through CaO injection ports (54), where finely powdered lime is added to the gas stream at temperatures of 350° F. to 600° F. Neutralization and particulate collection take place in the acid-gas neutralizer and fines collection equipment (56), which includes bag filters (58).

The following reactions control the capture of acid gases.

$$CaO + 2HCl \rightarrow CaCl_2 + H_2O$$

$$CaO + 2HF \rightarrow CaF_2 + H_2O$$

$$CaO + SO_2 + \tfrac{1}{2}O_2 \rightarrow CaSO_4$$

The reaction products—dry, stable salts—are collected in the bag filters (58) or optional cyclones without producing liquid effluent. The heat recovered from the exchanger (50) can be used to generate power with a turbine or to preheat incoming oxidant or feed streams, thereby enhancing overall system efficiency.

The system operates under a control system (42) that continuously monitors various process parameters, including kiln temperatures, gas composition ($O_2$, CO, $CO_2$, $CH_4$, $H_2$, $N_2$), rotation speed, torque, differential pressure across the kiln and filters, steam generation rate, and total energy balance. A programmable logic controller (PLC) continuously adjusts oxidant and fuel inputs based on temperature and gas-composition feedback to maintain zone-specific stoichiometry. Start-up usually involves auxiliary fuel until the reactor sustains itself under autothermal conditions.

To withstand halogen-rich and high-temperature environments, critical components of the reactor utilize corrosion- and halogen-resistant materials such as nickel-based alloys (e.g., Inconel 601) and silicon carbide-lined refractory. The rotary seal assemblies feature water-cooled bearings to prevent gas leakage and safeguard mechanical parts. The refractory lining usually contains 90-95% alumina with embedded thermocouples for temperature monitoring, and $ZrO_2$-based coatings may be applied in areas exposed to direct flame impingement for increased durability.

The system can operate in multiple modes based on process goals. In Energy-Recovery Mode, complete oxidation in Zone III creates clean, high-temperature flue gas suitable for steam production. In Syngas Mode, oxidation is stopped before Zone III to produce a combustible gas rich in CO and $H_2$ for downstream chemical synthesis such as methanol or Fischer-Tropsch processes. A Hybrid Mode enables dynamic adjustment of the oxygen-to-fuel ratio to balance energy recovery with syngas quality. By changing oxidant injection and residence time, operators can easily switch between efficient heat generation and feedstock conversion for chemical applications.

Pilot-scale demonstrations ranging from 1 to 5 TPD (tons per day) of feed have achieved self-sustaining operation after initial heat-up, maintaining outlet gas temperatures near 2,200° F. with variable auxiliary-fuel input. Full-scale modules can be designed in 25 TPD increments suitable for municipal, agricultural, or industrial waste management. Because the rotary kiln design tolerates large variations in feed composition, it is especially well suited for island installations, military bases, distilleries, sugarcane processors, livestock operations, and industrial parks seeking circular energy solutions. Steam recovered from the system can be used directly for on-site heating or electricity generation, while the neutralized solids are inert and can be safely disposed of or reused, for example, as additives in cement manufacturing.

Alternative embodiments of the invention may include using oxygen-steam mixtures to boost hydrogen production through the water-gas shift reaction; catalytic or metal-oxide-coated liners to facilitate tar cracking; electrostatic or plasma-based polishing reactors for final emissions control; dual concentric kiln configurations where an outer kiln acts as a radiant heater for an inner reaction chamber; and batch or semi-continuous operation suitable for small-scale deployments. Substituting alternative sorbents such as MgO, $Na_2CO_3$, or dolomite for CaO is also considered. Each embodiment maintains the same core principle of concentric multi-annular feed introduction, staged oxidation control, and in-situ acid-gas neutralization.

Representative performance results for a 5-ton-per-day system demonstrate the capability of the integrated process. Mixed wastes processed under the operating parameters defined above achieved consistent temperatures in Zones 1, 2, and 3, stable gas composition, and high acid-gas capture efficiencies. Chlorine, sulfur, and fluorine capture exceeded 90%, overall waste-mass reduction surpassed 80%, and the recovered steam exhibited saturated quality suitable for direct energy recovery. Solid effluent discharge rates remained low, and the produced gases were free of measurable halogen carryover, confirming the effectiveness of the process in achieving both environmental compliance and high-value energy recovery.

Data from pilot systems confirm process reproducibility across variable feed compositions, demonstrating commercial scalability and environmental compliance.

While specific embodiments have been described, variations and modifications within the scope of the appended claims will be apparent to those skilled in the art.

REPRESENTATIVE REFERENCES

Prior Art Patents

1. US 2013/0119315 A1—Gas distributor for a rotary kiln (Siemens AG)
2. U.S. Pat. No. 6,698,365 B1—Dual rotary kiln system for waste treatment (ABB Environmental Systems)
3. WO 1998/054273 A1—Method and apparatus for heating a rotary kiln (Hitachi Zosen Corp.)
4. US 2022/0389327 A1—Feeding of plastic waste material to a pyrolysis reactor (Neste Oyj)
5. US 2022/0228070 A1—Conversion of waste plastics to petrochemicals (ExxonMobil)
6. U.S. Pat. No. 9,885,478 B2—Method for generating combustible gas from organic feedstock (Recycling Solutions Technology LLC)
7. CN 106369610 A—Plasma rotary kiln gasification device for waste treatment (Shanghai Jiao Tong University)
8. WO 2010/049875 A2—Gasification of waste plastics with steam and air (Enerkem Inc.)
9. EP 2789947 A1—Treatment of waste materials containing fluorine (Veolia Environnement)
10. US 2015/0307749 A1—Integrated pyrolysis and gas cleaning system (Covanta Energy LLC)

Scientific & Technical Literature

11. Møller, H. B. et al. (2004). *Methane yield of manure and co-digestion substrates. Biomass and Bioenergy, 26(5),* 485-495.
12. Yadvika et al. (2004). *Enhancement of biogas production by co-digestion: A review. Bioresource Technology, 95(1),* 1-8.
13. Yao, S. et al. (2018). *Plasma-assisted catalytic conversion of methane to methanol. Nature Catalysis, 1(8),* 536-542.
14. Xu, H. et al. (2019). *Non-thermal plasma for conversion of methane to methanol. Chemical Engineering Journal,* 373, 1327-1340.
15. Holmen, A. & Silveston, P. (2014). *Catalytic conversion of hydrocarbons in short contact time reactors. Catalysis Today,* 228, 2-12.
16. Ryckebosch, E. et al. (2011). *Techniques for biogas upgrading to biomethane. Biomass and Bioenergy, 35(5),* 1633-1645.
17. Alburquerque, J. A. et al. (2012). *Characteristics of digestate from biogas production and its use as fertilizer. Waste Management,* 32(6), 994-1000.
18. Periana, R. A. et al. (1998). *Oxidation of methane to methanol via homogeneous catalysis. Science, 280(5363),* 560-564.

All patents and publications cited herein are incorporated by reference in their entirety.

What is claimed is:

1. A method for thermo-chemical conversion of mixed wet waste comprising food waste, plastics, biodegradable packaging, and fluorinated compounds, comprising:
   a) introducing said mixed waste into a rotary kiln reactor through a central conduit of a rotary kiln reactor;
   b) introducing auxiliary fuel into said rotary kiln reactor through a first annular conduit concentric with said central conduit;
   c) introducing oxidant gas into said rotary kiln reactor through a second annular conduit concentric with said first annular conduit;
   d) maintaining sub-stoichiometric conditions within said rotary kiln such that organic constituents undergo pyrolysis and gasification to form a reducing gas mixture containing hydrogen, carbon monoxide, and methane;

e) converting halogen species to hydrogen halides and sulfur species to hydrogen sulfide;

f) introducing additional oxidant downstream to achieve complete oxidation of residual gases;

g) injecting a calcium oxide sorbent to neutralize hydrogen halides and sulfur dioxide; and h) recovering cleaned flue gas and inert solids.

2. The method of claim 1 wherein said oxidant gas comprises air, oxygen-enriched air, or a mixture of oxygen and steam.

3. The method of claim 1 wherein reactor temperature is maintained between about 1,400° F. and 2,400° F.

4. The method of claim 1, wherein the feed moisture content is up to 60 wt. % without pre-drying.

5. The method of claim 1 further comprising recovering heat from flue gas to produce steam.

6. The method of claim 1 wherein the kiln rotation rate and slope are adjustable to control residence time.

7. The method of claim 1, wherein the inert solids comprise calcium chloride, calcium fluoride, and calcium sulfate.

8. The method of claim 1 further comprising using resulting syngas for energy or chemical synthesis.

9. The method of claim 1, wherein the reactor is divided into a plurality of temperature-controlled zones monitored by thermocouples and managed by a programmable logic controller.

10. The method of claim 1, wherein heat recovered from the flue gas generates steam at pressures between about 50 psia and 600 psia.

11. The method of claim 1, wherein said oxidant gas further comprises steam to promote a water-gas-shift reaction and increase hydrogen yield.

* * * * *